(12) United States Patent
Francois et al.

(10) Patent No.: US 7,198,162 B2
(45) Date of Patent: Apr. 3, 2007

(54) MOLDED CLOSURE AND APPARATUS FOR MAKING SAME

(75) Inventors: James A. Francois, Evansville, IN (US); Kerry W. Dodds, Gentryville, IN (US)

(73) Assignee: Rexam Medical Packaging Inc., Evansville, IN (US)

( * ) Notice: Subject to any disclaimer, the term of this patent is extended or adjusted under 35 U.S.C. 154(b) by 0 days.

(21) Appl. No.: 10/608,279

(22) Filed: Jun. 27, 2003

(65) Prior Publication Data

US 2004/0000532 A1    Jan. 1, 2004

Related U.S. Application Data

(62) Division of application No. 09/790,128, filed on Feb. 21, 2001, now Pat. No. 6,609,694.

(51) Int. Cl.
*B65D 41/04* (2006.01)

(52) U.S. Cl. ..................... 215/329; 222/153.1

(58) Field of Classification Search ............... 215/276, 215/214, 217, 350, 351, 329; 222/180, 153.06, 222/153.1, 562, 568; 249/59, 175
See application file for complete search history.

(56) References Cited

U.S. PATENT DOCUMENTS

| 330,545 | A | | 11/1885 | Barker |
| 1,844,442 | A | * | 2/1932 | Schmalz ..................... 215/329 |
| 2,130,749 | A | * | 9/1938 | Von Till ..................... 215/350 |
| 2,313,031 | A | | 3/1943 | Parkhurst |
| 3,055,526 | A | * | 9/1962 | Plunkett ..................... 215/329 |
| 3,618,170 | A | | 11/1971 | Owens |
| 3,690,496 | A | * | 9/1972 | Gibson ....................... 215/217 |
| 3,734,332 | A | * | 5/1973 | Grulich ...................... 215/208 |
| 3,784,045 | A | * | 1/1974 | Komendowski ............. 220/277 |
| 3,827,593 | A | * | 8/1974 | Kramb et al. ............... 215/208 |
| 4,209,485 | A | | 6/1980 | Greenspan |
| 4,343,754 | A | | 8/1982 | Wilde et al. |
| 4,564,113 | A | | 1/1986 | Mendler |
| 4,579,241 | A | | 4/1986 | Hayes |
| 4,649,013 | A | | 3/1987 | Yamamoto et al. |
| 4,767,587 | A | | 8/1988 | Towns et al. |
| 5,285,913 | A | * | 2/1994 | Morton ....................... 215/349 |
| 5,292,020 | A | * | 3/1994 | Narin ......................... 215/330 |
| 5,512,228 | A | | 4/1996 | Adams et al. |
| 5,820,807 | A | | 10/1998 | Urmston |
| 5,875,909 | A | * | 3/1999 | Guglielmini ................ 215/350 |
| 6,523,720 | B1 | * | 2/2003 | Robbins, III .................. 222/1 |

\* cited by examiner

*Primary Examiner*—Lien M. Ngo
(74) *Attorney, Agent, or Firm*—James E. Cole; Middleton Reutlinger

(57) ABSTRACT

A molded closure having an auxiliary thread for removal of an incomplete closure from a molding cavity, the molded closure including a helical auxiliary thread projecting inwardly from a cylindrical wall portion of the closure to provide engagement between the closure and the molding core, so that the closure may be threadably removed from the molding cavity by threadably disengaging the molding core from the molding cavity after an incomplete run of the fabrication process. A molding assembly with which the auxiliary thread may be formed in a molded closure is also provided.

1 Claim, 4 Drawing Sheets

MOLDED CLOSURE AND APPARATUS FOR MAKING SAME

CROSS-REFERENCE TO PRIOR APPLICATIONS

This application claims priority to and benefit of U.S. patent application Ser. No. 09/790,128, filed on Feb. 21, 2001, now U.S. Pat. No. 6,609,694, which is incorporated herein by reference.

BACKGROUND OF THE INVENTION

1. Technical Field

This invention relates to a molded closure and the molding assembly for making the closure. More particularly, this invention relates to a molded closure having an auxiliary thread for removing incomplete injection runs that occur during the fabrication of such molded closures.

2. Description of the Related Art

The manufacture of molded polymeric closures is well known in the art. Injection molding techniques wherein a polymeric material is introduced into a molding assembly in order to form a molded closure are well known. Such molded polymeric closures often include substantially hollow cylindrical wall portions having smooth inner walls. A faulty run, or short shot, of the fabrication process sometimes results in the formation of a fragmentary closure containing no principal thread. Such a fragmentary closure is difficult to remove from the molding cavity due to the lack of engagable structure which may be used to pry the incomplete closure from the cavity. Therefore, the production of such a fragmentary closure often requires suspension of the process while non-process tools are used to pry the closure out of the molding cavity, thereby resulting in loss of production and increase in the likelihood of damage to the manufacturing equipment.

Current solutions to the problem of removing fragmented articles from a mold include molding structure into the polymeric article that must be engaged by a separate tool in order to remove the article. For example, U.S. Pat. No. 2,313,031 discloses a plastic container having a plurality of lugs molded therein. Upon the occurrence of a faulty run, the plunger of the molding assembly must be removed so that a separate tool may be introduced into the mold. The tool engages the lugs and then removes the article from the mold. However, none of the prior solutions provide a simple structure formed in the article that allows for the removal thereof from the mold cavity simply by removing the mold core.

Therefore, a molded closure formed with a core-and-cavity molding assembly is needed that includes a simple structure therein which provides engagement between the closure and the molding core, so that a fragmentary unit of such a closure may be removed from the molding cavity using only the engagement between the closure structure and the molding core.

SUMMARY OF THE INVENTION

It is an object of the present invention to provide a molded polymeric closure having a simple structure that facilitates the removal of an incomplete closure from the molding assembly.

It is another object of the present invention to provide a molding assembly for making molding closures that forms simple structure in all closures molded therein which facilitates the removal of an incomplete closure from the molding assembly.

It is a further object of the present invention to provide an auxiliary thread on an inner surface of a cylindrical molded closure that facilitates the removal of an incomplete form of such a closure from the molding assembly.

It is yet another object of the present invention to provide a tiered closure having at least one auxiliary thread therein to provide engagement between a fragmentary tiered closure and a tiered mold core.

It is still a further object of the present invention to provide a method for making a molded closure having a simple structure that facilitates removal of an incomplete unit from the molding cavity.

More particularly, the present invention is directed to a molded closure having a top wall and a side wall depending downwardly therefrom with both a first closure thread and at least one second closure thread disposed on an inner wall of said side wall, the first closure thread being an auxiliary thread which is directed inwardly from the side wall. The auxiliary thread is preferably disposed at or near a top end of the side wall, which may be closed. The second closure thread or principal thread of the molded closure part serves as a fastening means between the closure and either a container or another closure part. The principal thread is disposed toward the bottom open end of the closure. The principal thread is also preferably disposed on an inner wall of the side wall of the closure. The closure may include one or more principal threads in combination with an auxiliary thread. Furthermore, the molded closure may include one or more tiers in the side wall. The auxiliary thread and the principal thread may be disposed on the same tier or upon different tiers. However, in each embodiment, the auxiliary thread is disposed on the side wall of the closure at a location opposite to the location of the principal thread.

During the molding process, the auxiliary thread, like the principal thread, provides an engagement between the closure and the molding core. However, unlike the principal thread, the auxiliary thread is formed at or near the first end of the closure where there would otherwise be only smooth and/or non-threaded surfaces. Therefore, when an incomplete or fragmentary closure is formed having no complete second end containing the principal thread, the auxiliary thread is available therein to provide a means for removing the incomplete closure from the molding cavity using only the engagement between the auxiliary thread and the molding core. Thus, even when the principal threads of a closure have not been properly formed, a means is provided by the present invention to threadably remove ill-formed closures from the molding cavity without resort to non-process tools or suspension of the manufacturing process.

The auxiliary thread's functionality is more limited than that of the principal thread. Namely, the auxiliary thread's only function is to assist in the removal of closures, even incomplete or ill-formed closures, from the closure cavity by the engagement of the auxiliary thread with the molding core. However, the principal thread not only functions to engage the molding core during the removal of the closure from the molding cavity, but it also provides a fastening and/or sealing means between the closure and a container or another closure part. The auxiliary thread may be either identical to or structurally different from one or more of the principal threads of the closure. Indeed, there may be incongruity between the auxiliary thread and the principal thread, wherein, for example, the depth, pitch, circumference, size, diameter or other aspect of the two threads differ.

The auxiliary thread may be smaller in size than the principal thread, since the only required function of the auxiliary thread is to provide sufficient engagement between a fragmented closure and the molding core. The auxiliary thread does not require the depth necessary for the principal thread to properly function, so the auxiliary thread's depth may be less than that of the principal thread. The pitch of the auxiliary thread may differ from that of the principal thread, since the principal thread must serve as a fastening and/or sealing means for the closure.

The apparatus for forming a molded closure having the auxiliary thread is also provided. The apparatus includes a molding assembly having a molding cavity and a molding core. The molding core includes a first inwardly projecting core thread in an outer surface thereof, preferably disposed toward the first end of the core, as well as a second inwardly projecting core thread. The second inwardly projecting core thread may have structural characteristics similar to those discussed above which differ from those of the first core thread, such as size, depth and pitch. When polymeric material is provided into the molding void between the molding cavity and molding core, the first core thread of the molding core forms an auxiliary thread on the molded closure formed therein.

It will become apparent that other objects and advantages of the present invention will be obvious to those skilled in the art upon reading the detailed description of the preferred embodiment set forth hereinafter.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
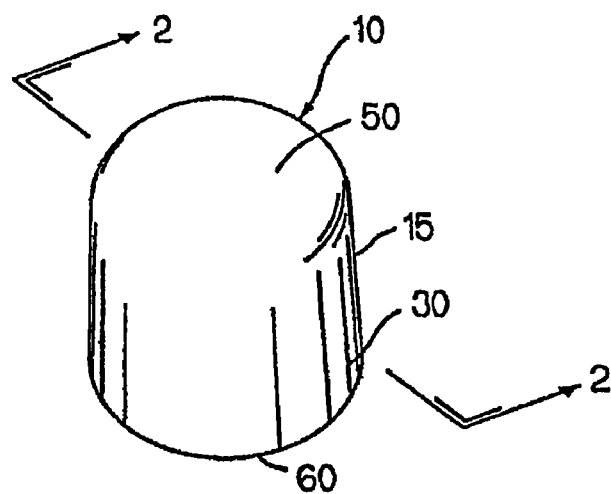
FIG. 1 is a perspective view of a preferred embodiment of a closure component of the present invention.

As shown in FIGS. 1–6, a molded closure 10 has an auxiliary thread 20 to provide engagement between the closure 10 and a molding core 205 during fabrication of the closure, so that the closure 10 may be removed from the molding cavity 206 if the closure 10 is not completed during the molding process. The molded closure 10 is formed of any polymeric material well known in the art for making such articles. The molded closure 10 is made by processes well known in the art, with the exception of providing a simple structure therein, such as the auxiliary thread 20, that facilitates the removal of incomplete closures, or short shots, from the molding cavity 206, simply by separating the molding core 205 from the molding cavity 206. The molded closure 10 of the present invention preferably includes a side wall having a cylindrical wall portion with a smooth inner wall. An auxiliary thread 20 is disposed on the inner wall 35 of the cylindrical wall portion 30 in a location where a container engagement would not normally be disposed. During the molding process, this auxiliary thread serves to engage the molding core in order to remove the closure in which it is formed from a molding cavity.

Figure 2:
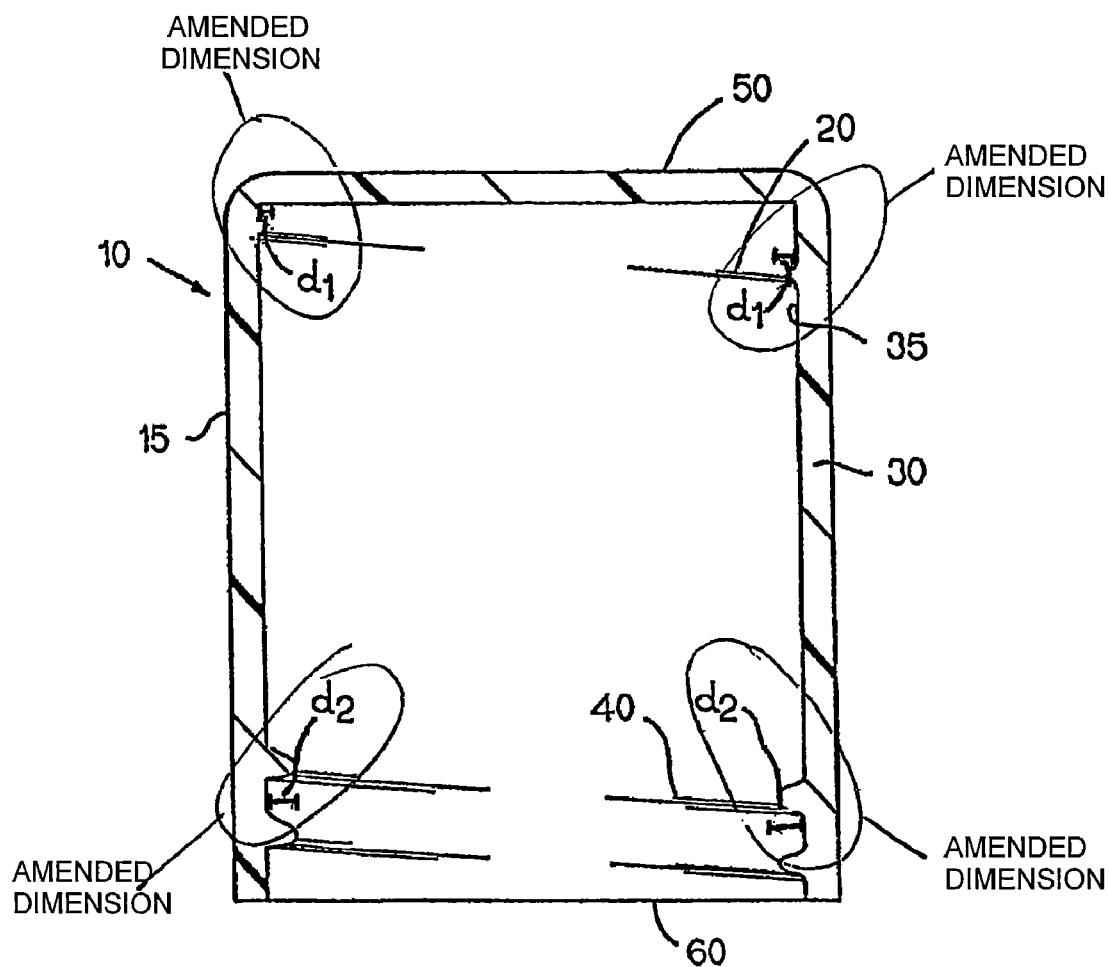
FIG. 2 is a cross-sectional view of the closure component of FIG. 1. including depth demarcations taken along line 2—2 of FIG. 1.
Figure 4:
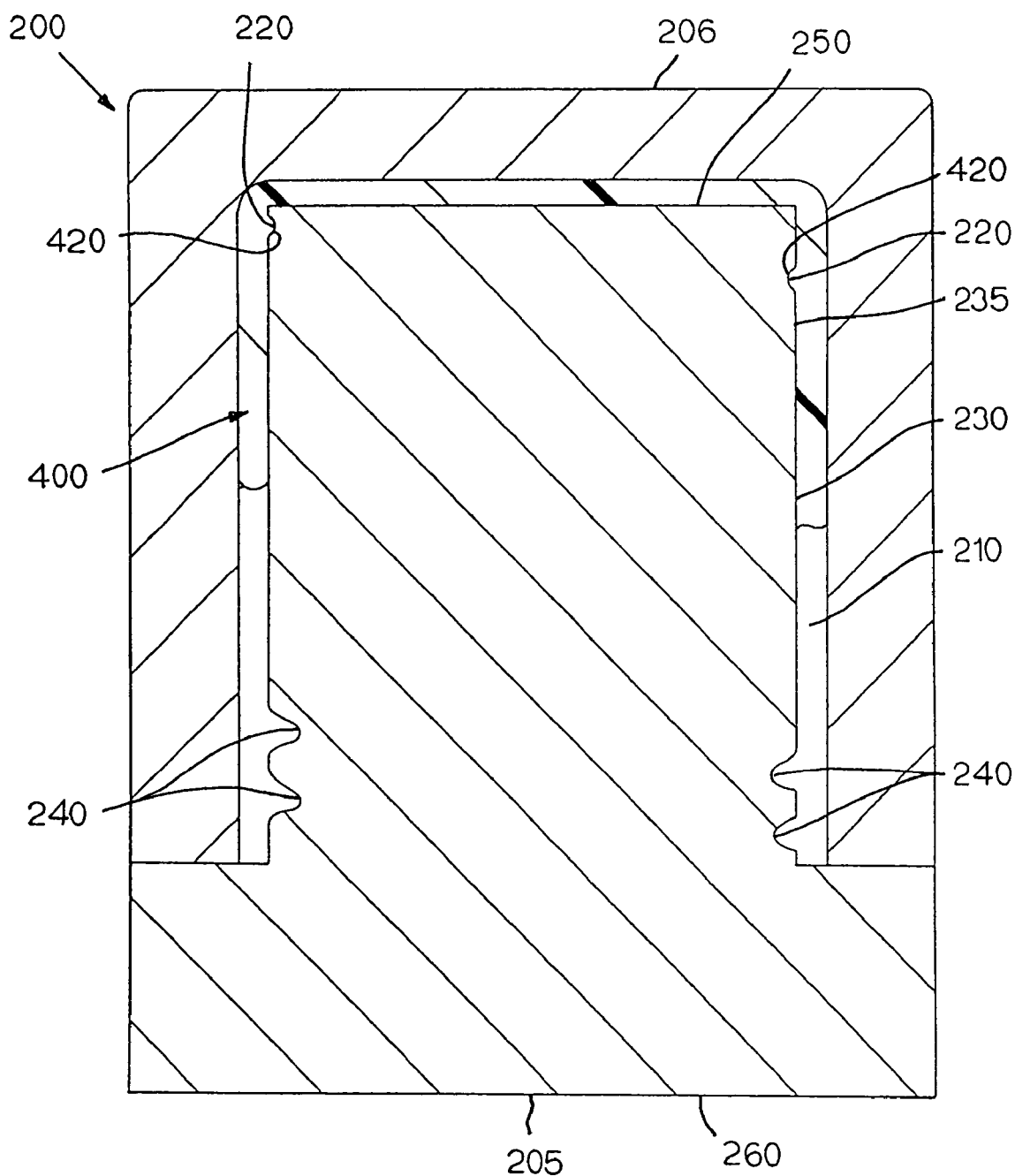
FIG. 4 is a cross-sectional view of the molding assembly of FIG. 3 including an incomplete closure component therein.
Figure 5:
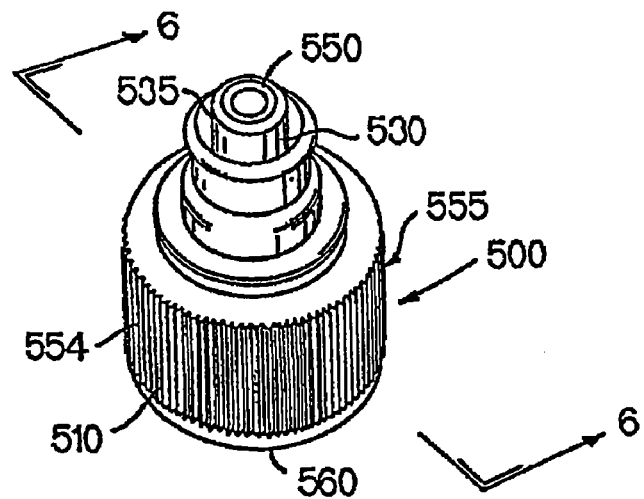
FIG. 5 is a perspective view of another preferred embodiment of the closure component of the present invention.
Figure 6:
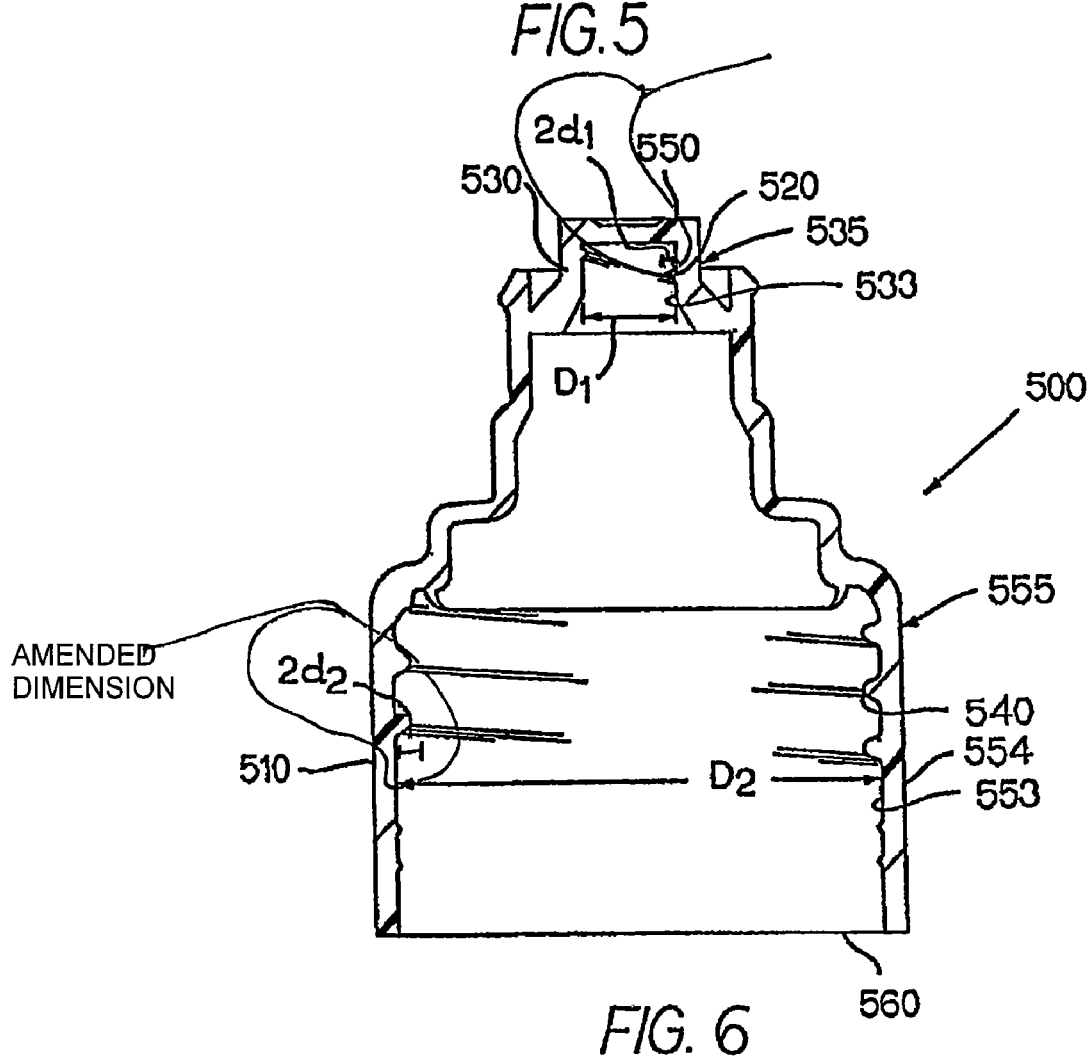
FIG. 6 is a cross-sectional view of the closure component of FIG. 5 taken along line 6—6.
Figure 1:
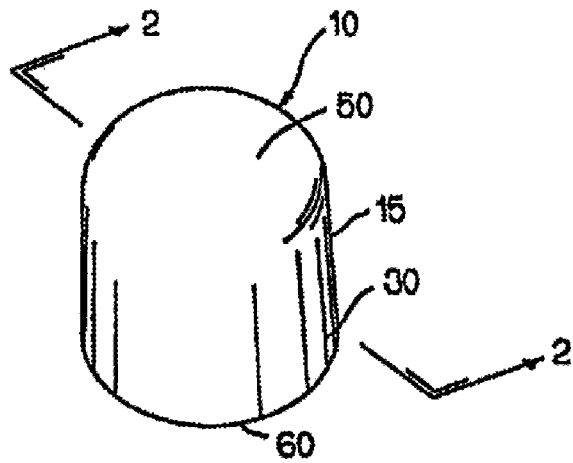
Figure 2:
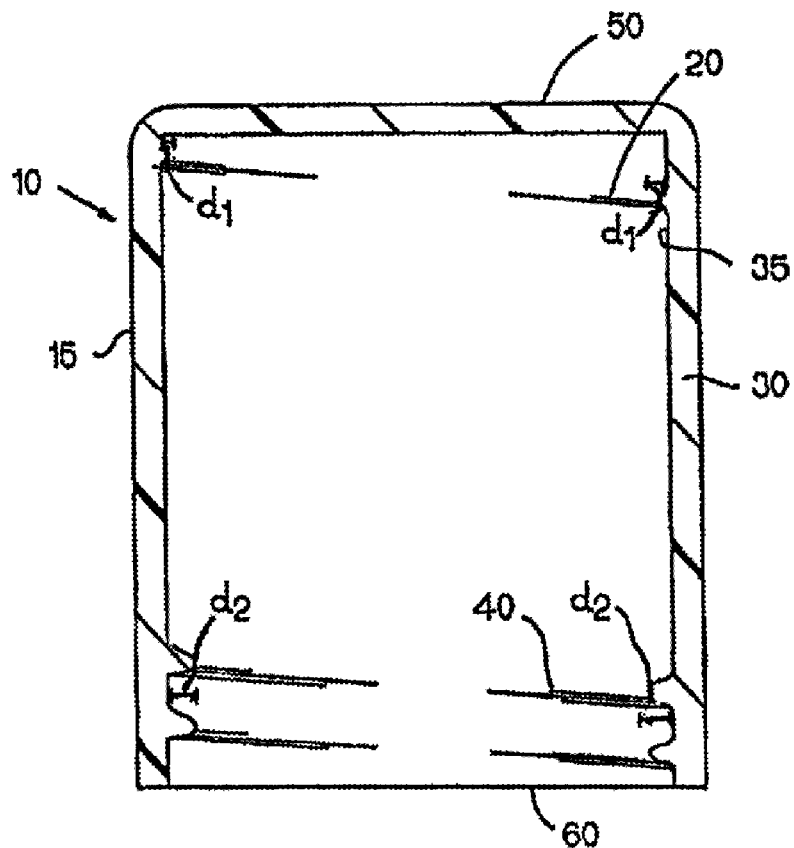
Figure 3:
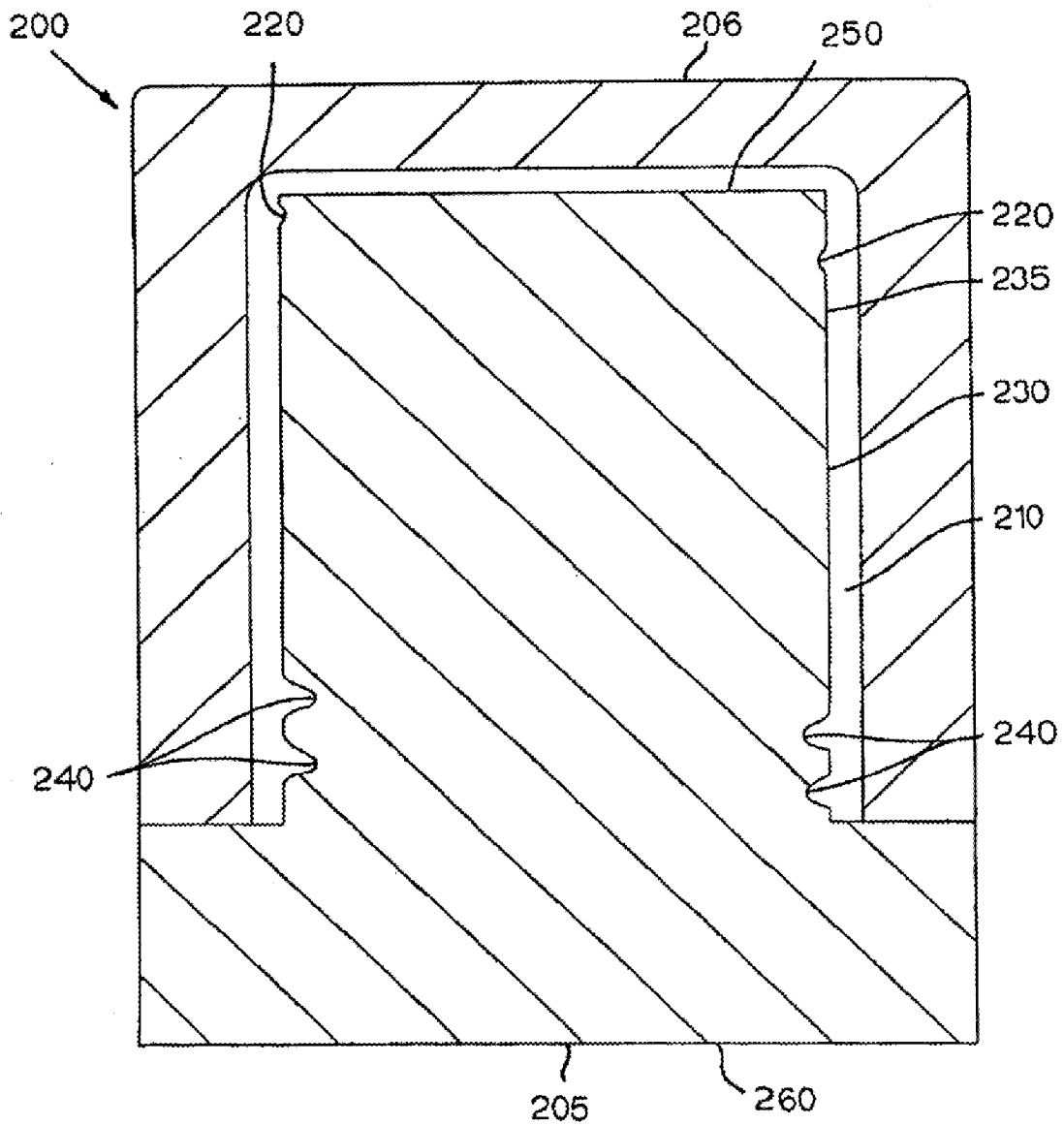
Figure 4:
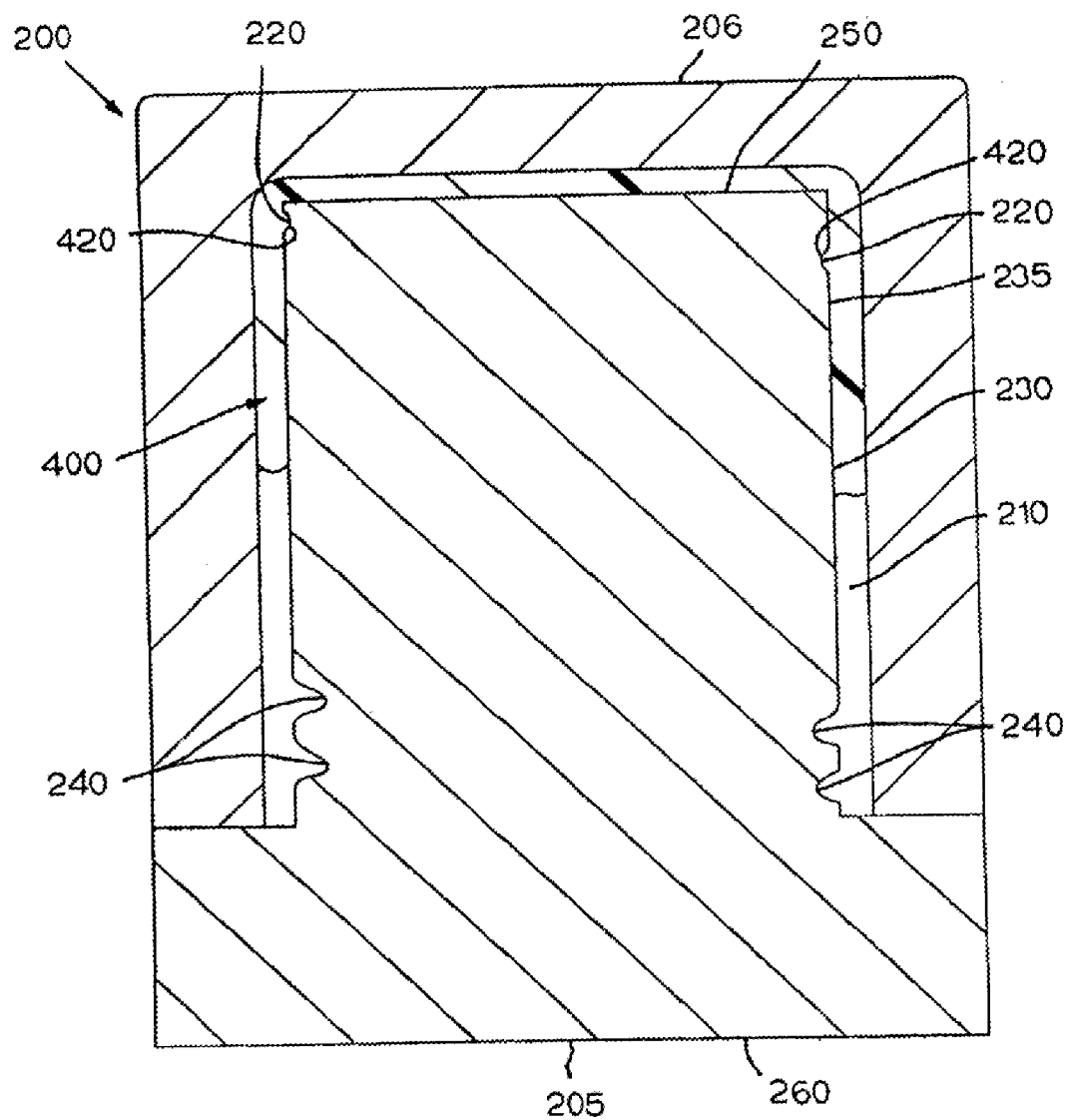
Figure 5:
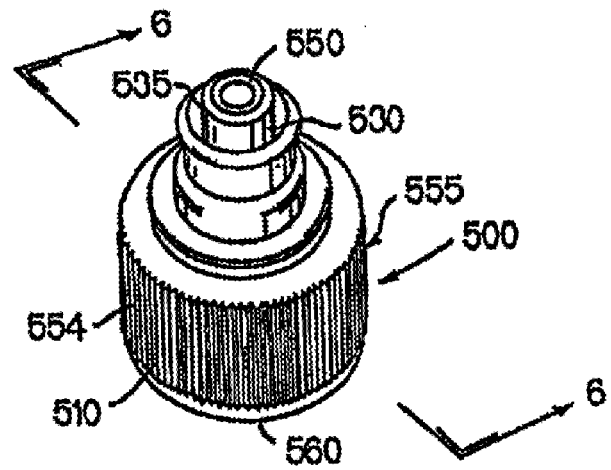
Figure 6:
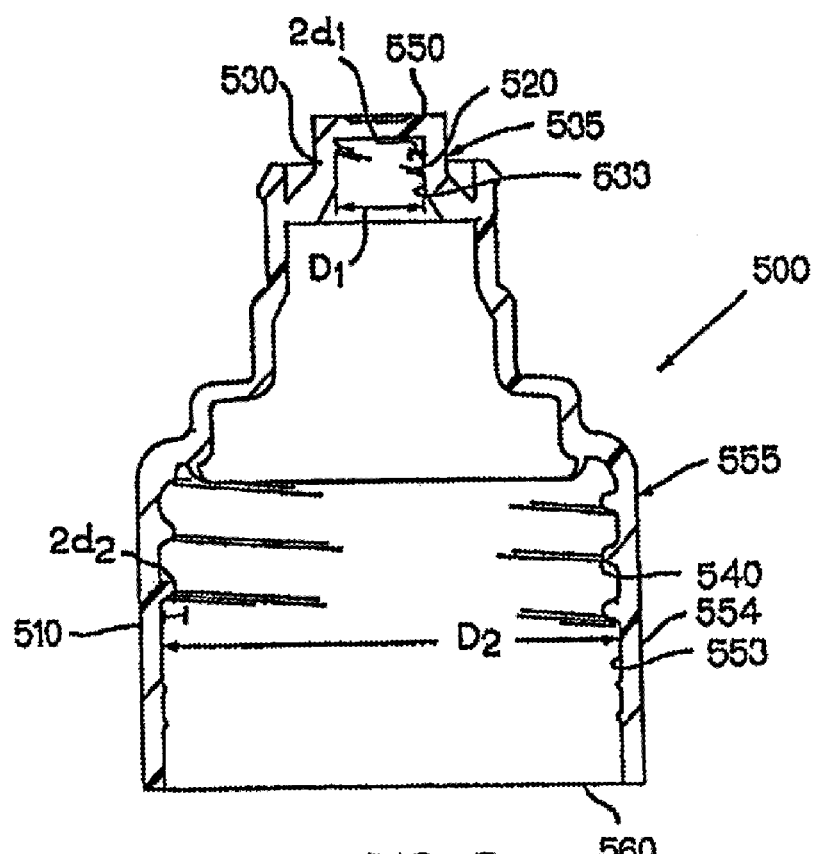

As shown in FIGS. 1–6, the auxiliary thread 20 may be provided on any molded closure 10 having a cylindrical wall portion 30 with at least a first inner wall 35. The molded closure 10 has a first end 50 and a second end 60. The auxiliary thread 20, is disposed on an inner wall 35 of a cylindrical wall portion 30 of the side wall 15 of molded closure 10. The auxiliary thread 20 is preferably helical and projects inwardly from the inner wall 35. A principal thread 40, is also disposed on a cylindrical wall portion 30 of the side wall 15, and projects inwardly from the inner wall 35. The auxiliary thread 20 is disposed on the inner wall 35 toward the first end 50 of the side wall 15 and the principal thread 40 is disposed on the inner wall 35 toward the second end 60 of the side wall 15. The auxiliary thread 20 is preferably at or near the first end 50 of the side wall 15, so that it will be formed in any closure, no matter how fragmentary. The auxiliary thread 20 is disposed distally of other threads within the molded closure 10 in order to provide an engagement between the closure and the molding core where there would otherwise be none. As shown in FIGS. 2 and 6, the auxiliary thread 20 may be disposed on either the same inner wall 35 or 553 or a different inner wall 533, if the closure is tiered, of the side wall 15 as is the principal thread 40. Furthermore, the auxiliary thread 20 may be disposed on either the same cylindrical wall portion 30 of the side wall 15 or a different cylindrical wall portion as is the principal thread 40.

Although the auxiliary thread 20 may be identical to the principal thread 40, the auxiliary thread 20, as best shown in FIG. 2, is preferably incongruent with the principal thread 40 of the closure 10. The auxiliary thread 20 may have a circumference, diameter, size, length, depth, and/or pitch that differs from those of the principal thread 40. Since the function (providing engagement between a fragmentary closure and the molding core) of the auxiliary thread 20 does not require the same structural aspects as the functions of the principal thread 40 (fastening the closure part to a container and/or another closure part or forming a seal), the auxiliary thread 20 may differ structurally from the principal thread 40. More particularly, the depth $d_1$ of the auxiliary thread 20 may be less than the depth $d_2$ of the principal thread. The depth of a thread is the distance between its point of attachment to the wall of the closure and its point of greatest displacement therefrom. The depth $d_1$ of the auxiliary thread 20 is less than the depth $d_2$ of the principal thread 40. Indeed, the depth $d_1$ of the auxiliary thread 20 need only be great enough to provide sufficient engagement between an incomplete molded closure, or short shot, and the molding cavity, so the depth $d_1$ may be significantly less than the depth $d_2$ of the principal thread 40. For example, the depth $d_1$ may be as small as one-half or one-tenth the depth $d_2$. In a preferred embodiment, the depth $d_1$ of the auxiliary thread 20 is minimized so as to conserve polymeric material used in the manufacture of the molded closure 10. Furthermore, depending on the overall design of the molded closure, the depth $d_1$ of the auxiliary thread 20 may be required to be less than the depth $d_2$ of the principal thread 40 to ensure that the auxiliary thread 20 does not interfere with the overall function of the principal thread 40 or any other element of the molded closure 10, such as in the formation of a seal between the molded closure and a container to which the closure is attached.

The pitch of the auxiliary thread 20 may also either differ from or be the same as the pitch of the principal thread 40, depending upon the pitch of the threads of the molding core and the functional requirements of the principal threads, the pitch of the thread being its degree of slope. In a preferred embodiment, the first closure or auxiliary thread 20 has a first pitch and the second closure or principal thread 40 has a second pitch. This first pitch does not equal the second pitch. The pitch of the auxiliary thread 20 is equal or similar to the pitch of any threaded portion of the molding core that affects the disengagement of the core from the molding cavity, so that, when the molding core is removed from the molding cavity, a fragmentary closure would move easily with the molding core. Since the principal thread 40 has functions in addition to engaging the molding core, the pitch of the principal threads may differ from those of the disengagement mechanism of the molding core (not shown). Thus, the auxiliary thread 20 and the principal thread 40 may have differing pitches.

The auxiliary thread 20 is preferably helical so that a fragmented closure or short shot may remain attached to the molding core while the core is being rotatably disengaged from the molding cavity after the formation of the short shot.

Figure 3:
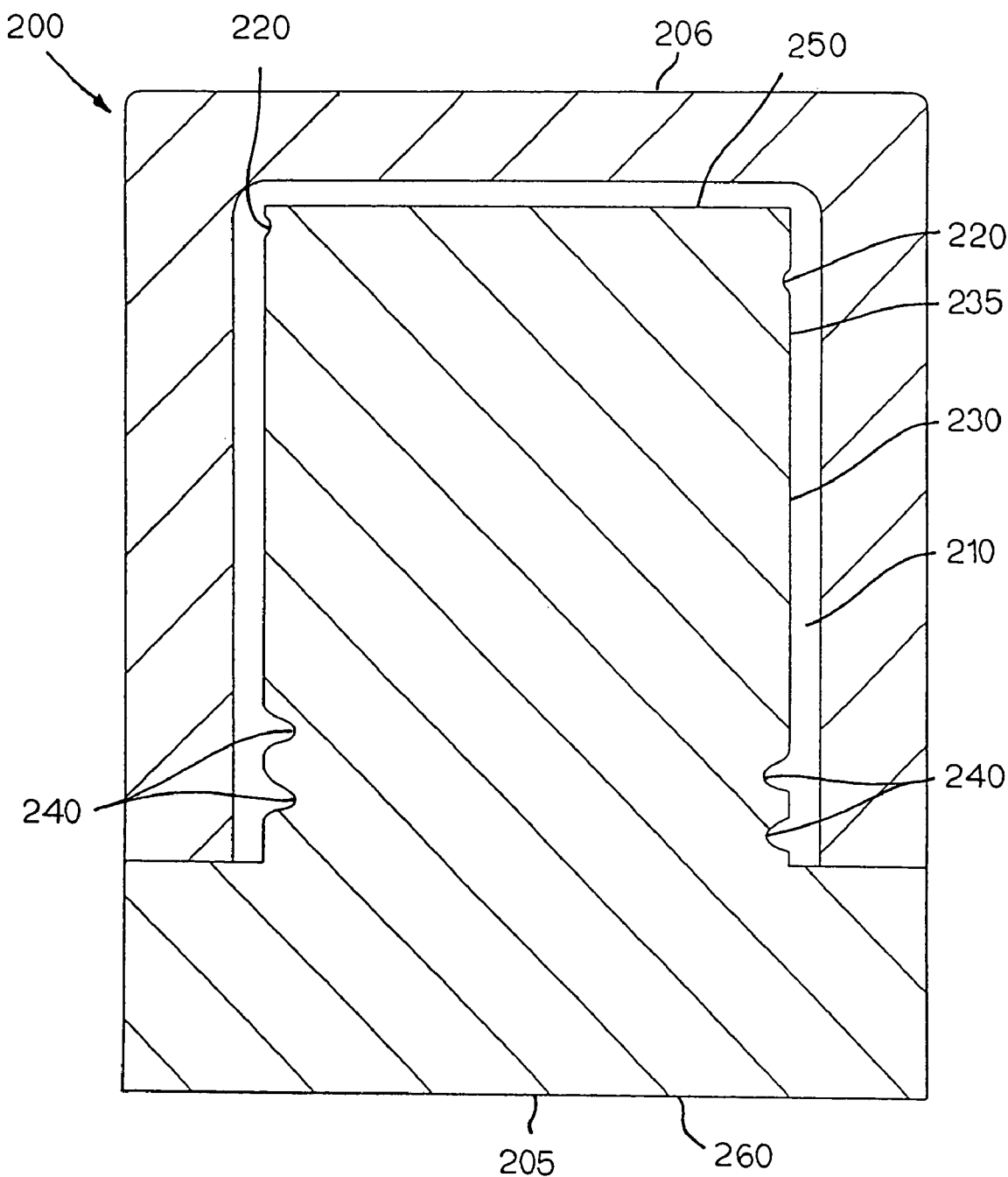
FIG. 3 is a cross-sectional view of one preferred embodiment of the molding assembly of the present invention.

As shown in FIG. 3, a molding assembly 200 of the present invention is provided with a molding core 205 and a molding cavity 206. The molded closure 10 of FIG. 1 may be formed with the molding assembly 200 by providing, preferably injecting, a fluid polymeric material, such as polypropylene, polyethylene or polyvinylchloride, into the molding void 210 between the molding core 205 and the molding cavity 206. The fluid polymeric material is allowed to solidify within the molding void 210, thereby forming the structure provided along the surfaces of the molding cavity 206 and the molding core 205. More particularly, a first core thread 220 is disposed in an outer wall 235 of a cylindrical wall portion 230 of the molding core 205 toward a first end 250 thereof. A second core thread 240 is provided in the outer wall 235 of the cylindrical wall portion 230 of the molding core 205 toward the second end 260 thereof. The first core thread 220 is preferably helical and may be incongruent with the second core thread 240. The first core thread 220 forms the auxiliary thread 20 of the closure 10 shown in FIG. 2 in any molded closure having a first end formed within the molding assembly 200.

As shown in FIG. 4, an incomplete closure, or short shot, 400 may be formed in the molding assembly 200 during the fabrication process. The short shot 400 includes only the auxiliary thread 420, which is formed therein by the first core thread 220 of the molding core 205, and not a principal thread that would otherwise be formed in a complete closure by second core thread 240 of molding core 205. Thus, when an incomplete closure 400 is formed an auxiliary thread 420 is provided therein by which the incomplete closure 400 may be threadably removed from the molding cavity 206. In current closures, no structure is normally provided toward the first end of the cylindrical wall portion thereof by which the closures may be threadably removed from the molding cavity 206. Therefore, when a short shot having no principal thread is normally formed with current molding methods, only smooth and/or non-threadable walls are provided. Such walls provide insufficient engagement between the short shot and the molding core to allow for the removal of the short shot from the molding cavity using only the molding core. Thus, the manufacturing process using current molding methods must be suspended and a tool or other means inserted into the cavity to remove the short shot therefrom. However, the auxiliary thread 420 provided in the short shot 400, shown in FIG. 4, provides the necessary engagement between the molding core 205 and the short shot 400 to remove the short shot 400 with the molding core 205, when the molding core 205 is threadably disengaged from the molding cavity 206. No other tools or suspension of the manufacturing process is required with the molding apparatus of the present invention.

FIGS. 5 and 6 show another embodiment of a molded closure component of the present invention containing an auxiliary thread 520. The molded closure component 500 includes a side wall 510 with multiple tiers having cylindrical wall portions therein. The first tier 535 includes a cylindrical wall portion 530 in which an auxiliary thread 520 is formed. Auxiliary thread 520 is helical and projects inwardly from a first inner wall 533 of the cylindrical wall portion 530 and is disposed toward a first end 550 of the side wall 510 of the molded closure component 500. A principal thread 540 is disposed in a cylindrical wall portion 554 of a second tier 555 of the side wall 510. The principal thread 540 projects inwardly from a second inner wall 553 of the cylindrical wall portion 554 and is disposed toward a second end 560 of the side wall 510. The auxiliary thread 520 is incongruent with the principal thread 540. Namely, as shown in FIG. 6, the auxiliary thread 520 has a depth $2d_1$ that is less than the depth $2d_2$ of the principal thread 540. Furthermore, the auxiliary thread 520 may have a pitch that differs from the pitch of the principal thread 540. In a preferred embodiment, the pitch of auxiliary thread 520 is greater than the pitch of the principal thread 540. The pitch of the auxiliary thread corresponds to the pitch of the molding core apparatus, so that when the molding core is threadably disengaged from the molding cavity the molded closure moves along with the molding core.

The auxiliary thread of the present invention may also differ from the principal thread of the closure in that the diameter of the cylindrical wall portion of the side wall of the closure that intersects a portion of the auxiliary thread is less than the diameter of the cylindrical wall portion that intersects the principal thread. More particularly, as shown in FIG. 6, cylindrical wall portion 535 has a diameter $D_1$ that intersects a portion of auxiliary thread 520. Diameter $D_1$ is smaller than the diameter $D_2$ which intersects a portion of principal thread 540. Diameter $D_2$ is the distance between the inner side wall of the cylindrical wall portion 554. As shown in FIGS. 5 and 6, the tiers of closure 500 are progressively smaller in diameter toward the first end 550 of the side wall 510 of the closure. Since the auxiliary thread is preferably disposed toward the first end of the molded closure of the present invention, the diameter intersecting the auxiliary thread is preferably smaller than the diameter intersecting the principal thread within a distally tapering tiered closure component.

In use, the auxiliary thread of the present invention may be used to remove an incomplete molded closure from a molding cavity by first inserting a molding core into a molding cavity. The provided molding core has at least one cylindrical wall portion at a first end thereof and a first helical core thread disposed at the first end of the molding core within an outer wall thereof. The provided molding cavity engages the molding core in order to form such a closure. A fluid polymeric material, such as polyethylene, polypropylene or polyvinyl chloride is provided, preferably injected, into a void disposed between the molding core and the molding cavity. The fluid polymeric material is then allowed to solidify, thereby forming an incomplete molded closure. The molding core is then threadably disengaged from the molding cavity, while the molding core engages the incomplete molded closure by the first helical thread. The incomplete molded closure is thereby separated from the molding cavity.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

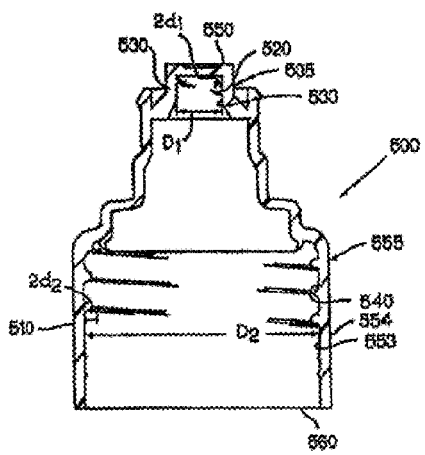

What is claimed is:

1. A molded closure comprising:

a dispenser having an upper aperture for dispensing a fluid;

a cylindrical side wall having a first inner wall on which an auxiliary thread is disposed, said auxiliary thread being inwardly directed to engage a mold core thread and enable removal of said closure from said mold core after a short shot;

said side wall also having at least one principal thread being inwardly directed thereon for engaging a container neck finish;

said auxiliary thread being disposed at a first end of said side wall to inhibit engagement of said auxiliary thread and said container neck finish and said principal thread being disposed toward an opposed second end of said side wall;

wherein said side wall includes a first tier and a second tier, said first tier including said first inner wall of said side wall portion and said second tier including a second inner wall, said auxiliary thread being disposed on said first inner wall and said principal thread being disposed on said second inner wall;

said auxiliary thread having a first depth and said principal thread having a second depth, said second depth being at least about twice said first depth.

* * * * *

UNITED STATES PATENT AND TRADEMARK OFFICE
CERTIFICATE OF CORRECTION

PATENT NO. : 7,198,162 B2
APPLICATION NO. : 10/608279
DATED : April 3, 2007
INVENTOR(S) : James A. Francois It is certified that error appears in the above-identified patent and that said Letters Patent is hereby corrected as shown below:

The Title Page, showing an illustrative figure, should be deleted and substitute therefor the attached Title Page.

Delete drawings sheets 1-4 and substitute therefor the drawing sheets, consisting of figs. 1-6 as shown on the attached page.

Col. 5, line 32, "polyvinylchloride" should be --polyvinyl chloride--

Signed and Sealed this

Third Day of June, 2008

JON W. DUDAS
*Director of the United States Patent and Trademark Office*

United States Patent
Francois et al.

(10) Patent No.: US 7,198,162 B2
(45) Date of Patent: Apr. 3, 2007

(54) MOLDED CLOSURE AND APPARATUS FOR MAKING SAME

(75) Inventors: James A. Francois, Evansville, IN (US); Kerry W. Dodds, Gentryville, IN (US)

(73) Assignee: Rexam Medical Packaging Inc., Evansville, IN (US)

( * ) Notice: Subject to any disclaimer, the term of this patent is extended or adjusted under 35 U.S.C. 154(b) by 0 days.

(21) Appl. No.: 10/608,279

(22) Filed: Jun. 27, 2003

(65) Prior Publication Data
US 2004/0000532 A1  Jan. 1, 2004

Related U.S. Application Data

(62) Division of application No. 09/790,128, filed on Feb. 21, 2001, now Pat. No. 6,609,694.

(51) Int. Cl.
B65D 41/04  (2006.01)
(52) U.S. Cl. ................... 215/329; 222/153.1
(58) Field of Classification Search ............... 215/276, 215/214, 217, 350, 351, 329; 222/180, 153.06, 222/153.1, 562, 568; 249/59, 175
See application file for complete search history.

(56) References Cited

U.S. PATENT DOCUMENTS

| | | | |
|---|---|---|---|
| 339,545 A | 11/1885 | Barker | |
| 1,844,442 A * | 2/1932 | Schmalz | 215/329 |
| 2,130,749 A * | 9/1938 | Von Till | 215/350 |
| 2,313,031 A | 3/1943 | Parkhurst | |
| 3,055,526 A * | 9/1962 | Plunkett | 215/329 |
| 3,618,170 A | 11/1971 | Owens | |
| 3,690,496 A * | 9/1972 | Gibson | 215/217 |
| 3,734,332 A * | 5/1973 | Grulich | 215/208 |
| 3,784,045 A * | 1/1974 | Komendowski | 220/277 |
| 3,827,593 A * | 8/1974 | Kramb et al. | 215/208 |
| 4,209,485 A | 6/1980 | Greenspan | |
| 4,343,754 A | 8/1982 | Wilde et al. | |
| 4,564,113 A | 1/1986 | Mendler | |
| 4,579,241 A | 4/1986 | Hayes | |
| 4,649,013 A | 3/1987 | Yamamoto et al. | |
| 4,767,587 A | 8/1988 | Towns et al. | |
| 5,285,913 A * | 2/1994 | Morton | 215/349 |
| 5,292,020 A | 3/1994 | Narin | 215/330 |
| 5,512,228 A | 4/1996 | Adams et al. | |
| 5,820,807 A | 10/1998 | Urmston | |
| 5,875,909 A * | 3/1999 | Guglielmini | 215/350 |
| 6,523,720 B1 * | 2/2003 | Robbins, III | 222/1 |

* cited by examiner

*Primary Examiner*—Lien M. Ngo
(74) *Attorney, Agent, or Firm*—James E. Cole; Middleton Reutlinger

(57) ABSTRACT

A molded closure having an auxiliary thread for removal of an incomplete closure from a molding cavity, the molded closure including a helical auxiliary thread projecting inwardly from a cylindrical wall portion of the closure to provide engagement between the closure and the molding core, so that the closure may be threadably removed from the molding cavity by threadably disengaging the molding core from the molding cavity after an incomplete run of the fabrication process. A molding assembly with which the auxiliary thread may be formed in a molded closure is also provided.

1 Claim, 4 Drawing Sheets